US008604859B2

(12) United States Patent
Lee

(10) Patent No.: US 8,604,859 B2
(45) Date of Patent: Dec. 10, 2013

(54) DC-OFFSET CORRECTION CIRCUIT

(75) Inventor: Yang-Han Lee, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 418 days.

(21) Appl. No.: 13/159,367

(22) Filed: Jun. 13, 2011

(65) Prior Publication Data

US 2012/0235650 A1 Sep. 20, 2012

(30) Foreign Application Priority Data

Mar. 17, 2011 (CN) .......................... 2011 1 0064454

(51) Int. Cl.
*H03L 5/00* (2006.01)
(52) U.S. Cl.
USPC ................ 327/307; 327/362; 375/346; 330/9
(58) Field of Classification Search
USPC ................ 327/307, 362, 538–543, 551–559; 375/346, 319; 330/9; 323/234
See application file for complete search history.

(56) References Cited

U.S. PATENT DOCUMENTS

| 5,646,570 | A * | 7/1997 | Blodgett ........................ 327/362 |
| 7,042,252 | B2 * | 5/2006 | Galloway et al. ................ 327/16 |
| 7,142,047 | B2 * | 11/2006 | Sahandiesfanjani et al. ..... 330/9 |
| 7,408,390 | B2 * | 8/2008 | Yamada ........................ 327/124 |
| 7,525,365 | B1 * | 4/2009 | Henry ........................... 327/307 |
| 7,551,023 | B2 * | 6/2009 | Ebner ............................. 330/85 |
| 7,902,900 | B2 * | 3/2011 | Liu et al. ........................ 327/307 |

* cited by examiner

*Primary Examiner* — Lincoln Donovan
*Assistant Examiner* — Thomas Skibinski
(74) *Attorney, Agent, or Firm* — Altis Law Group, Inc.

(57) ABSTRACT

A DC-offset correction circuit for a target circuit with an output terminal and a feedback input terminal. The DC-offset correction circuit includes an obtaining module and a correction module. The obtaining module obtains a DC-offset voltage from the output terminal. The correction module includes a first charging switch, a first inductor connected to the first charging switch in order from the output terminal to the feedback input terminal, and a first charging capacitor connected between ground and the node of the feedback input terminal and the first charging switch. When the voltage of the feedback input terminal is less then the DC-offset voltage, the correction module closes the first charging switch. When the voltage of the feedback input terminal is equal to the DC-offset voltage, the correction module opens the first charging switch.

11 Claims, 2 Drawing Sheets

DC-OFFSET CORRECTION CIRCUIT

BACKGROUND

1. Technical Field

The present disclosure relates to a DC-offset correction circuit.

2. Description of Related Art

In digital communication systems, a DC-offset is introduced into received signals. The received signals will be distorted by the mixed DC-offset, thereby leading to inaccurate data decoding.

What is needed, therefore, is a DC-offset correction circuit capable of overcoming the described limitations.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments.

DETAILED DESCRIPTION

Embodiments of the present disclosure are described in detail as follows, with reference to the accompanying drawings.

Figure 1:
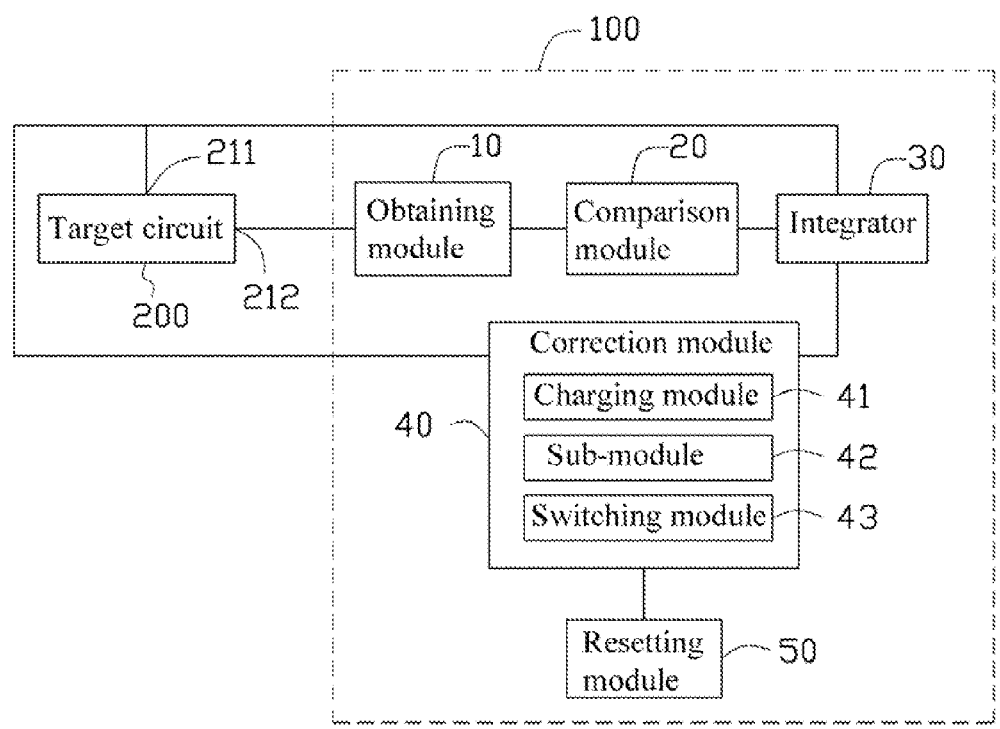
FIG. 1 is a schematic view of a DC-offset correction circuit according to an exemplary embodiment.
Figure 2:
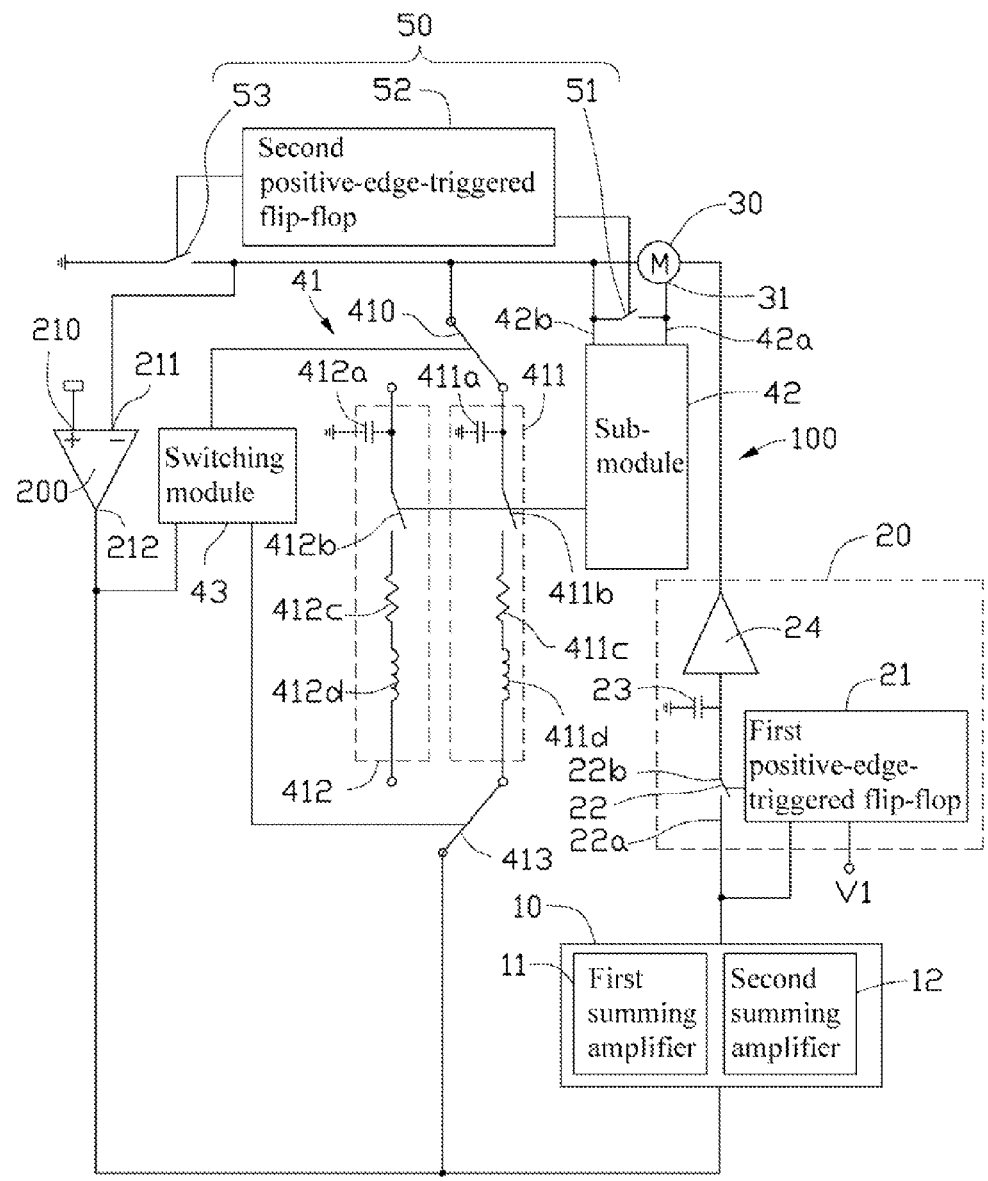
FIG. 2 is a circuit diagram of the DC-offset correction circuit of FIG. 1.

Referring to FIGS. 1 and 2, a DC-offset correction circuit 100, according to an exemplary embodiment, is electrically connected to a target circuit 200 with a DC-offset. The target circuit 200 can be selected from one of a frequency mixing system, a frequency independent system, and a multistage amplifier. In the present embodiment, the target circuit 200 is a gain amplifier with a 100 V/V gain. The target circuit 200 includes a signal input terminal 210 for receiving external signals, a feedback input terminal 211 for receiving feedback signals, and an output terminal 212. The DC-offset correction circuit 100 is connected between the output terminal 212 and the feedback input terminal 211. The DC-offset correction circuit 100 includes an obtaining module 10, a comparison module 20, an integrator 30, a correction module 40, and a resetting module 50.

The obtaining module 10 is electrically connected to the output terminal 212 of the target circuit 200 for obtaining a DC-offset voltage of the target circuit 200. In the present embodiment, the obtaining module 10 includes a first summing amplifier 11 and a second summing amplifier 12. The first summing amplifier 11 stores a sum of the output voltage of the output terminal 212 and the DC-offset voltage. The second summing amplifier 12 stores the sum of the opposite output voltage of the output terminal 212 and the DC-offset voltage. The obtaining module 10 gets twice the DC-offset voltage by adding the first summing amplifier 11 to the second summing amplifier 12. In other embodiments, the obtaining module 10 can get one DC-offset voltage by other circuits.

The comparison module 20 pre-sets a threshold voltage, and determines whether the DC-offset voltage from the obtaining module 10 is greater than the pre-set threshold voltage or not. The comparison module 20 outputs the DC-offset voltage to the correction module 40, when the DC-offset voltage is greater than the pre-set threshold voltage. In the present embodiment, the comparison module 20 includes a first positive-edge-triggered flip-flop 21, a temporary switch 22, a temporary capacitor 23, and a restoring amplifier 24. The obtaining module 10 and the temporary switch 22 are both electrically connected to the first positive-edge-triggered flip-flop 21. The first positive-edge-triggered flip-flop 21 is connected to a reference voltage V1. The reference voltage V1 is equal to the pre-set threshold voltage of the comparison module 20. The first positive-edge-triggered flip-flop 21 receives the DC-offset voltage from the obtaining module 10, and compares the DC-offset voltage with the reference voltage V1. The first positive-edge-triggered flip-flop 21 closes the temporary switch 22, when the DC-offset voltage is greater than the reference voltage V1. A terminal 22a of the temporary switch 22 is connected to the obtaining module 10. The other terminal 22b of the temporary switch 22 is connected to the temporary capacitor 23 and the restoring amplifier 24. The opposite end of the temporary capacitor 23 is connected to ground. The temporary capacitor 23 is charged for storing the voltage value of the DC-offset voltage, when the temporary switch 22 is closed. The restoring amplifier 24 amplifies the output voltage of the temporary capacitor 23 for restoring the DC-offset voltage.

The integrator 30 is connected between the restoring amplifier 24 and the feedback input terminal 211. The integrator 30 outputs an integrated DC-offset voltage to the correction module 40. The integrator 30 compensates the DC-offset voltage dynamically, when the output voltage of the target circuit 200 is changed.

The correction module 40 determines the DC-offset voltage is equal to the voltage of the feedback input terminal 211 or not. The correction module 40 increases the voltage of the feedback input terminal 211 to the DC-offset voltage, when the DC-offset voltage is not equal to the voltage of the feedback input terminal 211. Otherwise, the correction module 40 maintains the voltage of the feedback input terminal 211 unchanged.

The correction module 40 includes a charging module 41, a sub-module 42, and a switching module 43. The charging module 41 is electrically connected between the feedback input terminal 211 and the output terminal 212. The charging module 41 is controlled by the sub-module 42. The charging module 41 increases the voltage of the feedback input terminal 211. The charging module 41 includes a first switch 410, a first charging circuit 411, a second charging circuit 412, and a second switch 413. The first charging circuit 411 and the second charging circuit 412 are correspondingly used in two conditions that the target circuit 200 receives an external signal or not. The charging module 41 has shortest charging time in the two conditions by setting the first charging circuit 411 and the second charging circuit 412 correspondingly.

One end of the first switch 410 is electrically connected to the feedback input terminal 211, and the opposite end thereof is alternatively connected to the first charging circuit 411 and the second charging circuit 412. One end of the second switch 413 is electrically connected to the output terminal 212, and the opposite end thereof is alternatively connected to the first charging circuit 411 and the second charging circuit 412. The switching module 43 controls the first switch 410 and the second switch 413. The first charging circuit 411 or the second charging circuit 412 is electrically connected between the feedback input terminal 211 and the output terminal 212 by the first switch 410 and the second switch 413 respectively.

The first charging circuit 411 includes a first charging capacitor 411a, a first charging switch 411b, a first resistor 411c, and a first inductor 411d. In the present embodiment, the first charging capacitor 411a is 1 nanofarad. The first resistor 411c is 80 Kohms. The first inductor 411d is 40 milli-Henrys. The first charging switch 411b, the first resistor 411c and the first inductor 411d are connected in order from the first switch 410 to the second switch 413. A terminal of the first charging capacitor 411a is electrically connected to an end between the first switch 410 and the first charging switch 411b. The other terminal of the first charging capacitor 411b is connected to ground. The first charging switch 411b is controlled by the sub-module 42.

The second charging circuit 412 includes a second charging capacitor 412a, a second charging switch 412b, a second resistor 412c, and a second inductor 412d. In the present embodiment, the second charging capacitor 412a is 0.8 nanofarad. The second resistor 412c is 50 Kohms. The second inductor 412d is 5 milli-Henrys. The second charging switch 412b, the second resistor 4121c and the second inductor 412d are connected in order from the first switch 410 to the second switch 413. A terminal of the second charging capacitor 412a is electrically connected to an end between the second switch 413 and the second charging switch 412b. The other terminal of the second charging capacitor 412b is electrically connected to ground. The second charging switch 412b is controlled by the sub-module 42. The construction of the first charging circuit 411 and the second charging circuit 412 has higher charging efficiency than an RC amplifier.

The sub-module 42 is electrically connected to the integrator 30 and the feedback input terminal 211 for determining whether the DC-offset voltage is equal to the voltage of the feedback input terminal 211 or not. In the present embodiment, the sub-module 42 includes a first input terminal 42a and a second input terminal 42b. The first input terminal 42a is electrically connected to an output terminal 31 of the integrator 30. The second input terminal 42b is electrically connected to the feedback input terminal 211. An opposite end of the sub-module 42 is electrically connected to both the first charging switch 411b and the second charging switch 412b. When the DC-offset voltage is not equal to the voltage of the feedback input terminal 211, the sub-module 42 closes both the first charging switch 411b and the second charging switch 412b for charging the first charging capacitor 411a or the second charging capacitor 412a. Otherwise, the sub-module 42 opens both the first charging switch 411b and the second charging switch 412b for stopping the charging of the first charging capacitor 411a or the second charging capacitor 412a.

One end of the switching module 43 is electrically connected to the first switch 410, and an opposite end thereof is electrically connected to the output terminal 212 and the second switch 413. The switching module 43 determines whether the target circuit 200 receives a signal or does not receive the signal based on the output voltage of the output terminal 212. When the target circuit 200 receives a signal, the switching module 43 electrically connects the first charging circuit 411 between the output terminal 212 and the feedback input terminal 211 via the first switch 410 and the second switch 413. Otherwise, the switching module 43 electrically connects the second charging circuit 412 between the output terminal 212 and the feedback input terminal 211 via the first switch 410 and the second switch 413. In the present embodiment, the switching module 43 has a received signal strength indicator (not shown).

The resetting module 50 changes the voltage of the temporary capacitor 23, the first charging capacitor 411a, and the second charging capacitor 412a to zero. In the present embodiment, the resetting module 50 includes a first reset switch 51, a second positive-edge-triggered flip-flop 52, and a second reset switch 53. The first reset switch 51 is electrically connected between the first input terminal 42a and the second input terminal 42b of the sub-module 42. A terminal of the second reset switch 53 is electrically connected to the feedback input terminal 211, and the other terminal is connected to ground. The second positive-edge-triggered flip-flop 52 is connected between the first reset switch 51 and the second reset switch 53 to open or close the first reset switch 51 and the second reset switch 53.

In operation, the positive-edge-triggered flip-flop 52 closes the first reset switch 51 and the second reset switch 53 for discharging the first charging capacitor 411a or the second charging capacitor 412a at the moment of the target circuit 200 is started. The voltage of the first input terminal 42a and the second input terminal 42b is changed to zero.

When the voltage of target circuit 200 is stable, the positive-edge-triggered flip-flop 52 opens the first reset switch 51 and the second reset switch 53. The switching module 43 determines whether the target circuit 200 receives a signal or not with the received signal strength indicator. In the present embodiment, when the target circuit 200 receives a signal, the switching module 43 electrically connects the first charging circuit 411 between the output terminal 212 and the feedback input terminal 211.

The obtaining module 10 obtains the DC-offset voltage of the target circuit 200. If the DC-offset voltage is greater than the pre-set threshold voltage of the comparison module 20, the first positive-edge-triggered flip-flop 21 closes the temporary switch 22 for charging the temporary capacitor 23. Then the DC-offset voltage is applied on the first input terminal 42a of the sub-module 42 through the restoring amplifier 24 and the integrator 30. The voltage of the first input terminal 42a is greater than that of the second input terminal 42b because the voltage of the second input terminal 42b is zero. The sub-module 42 closes the first charging switch 411b for charging the first charging capacitor 411a. When the voltage of the first input terminal 42a is equal to the second input terminal 42b, the sub-module 42 opens the first charging switch 411b. The first charging capacitor 411a and the second charging capacitor 412a maintains the voltage of the feedback input terminal 211 to be equal to the DC-offset voltage for compensating the DC-offset voltage. If the DC-offset voltage is greater than the pre-set threshold voltage of the comparison module 20 again, the DC-offset correction circuit 100 works as the steps mentioned-above except the restoring step.

The DC-offset correction circuit 100 takes 1.823 microseconds, when the DC-offset voltage is 10 microvolt. A low-pass filter always takes about 7 microseconds. The DC-offset correction circuit 100 is faster than the low-pass filter.

While certain embodiments have been described and exemplified above, various other embodiments will be apparent to those skilled in the art from the foregoing disclosure. The present disclosure is not limited to the particular embodiments described and exemplified, and the embodiments are capable of considerable variation and modification without departure from the scope of the appended claims.

What is claimed is:

1. A DC-offset correction circuit for a target circuit, the target circuit comprising an output terminal and a feedback input terminal, the DC-offset correction circuit connected between the output terminal and the feedback input terminal, and the DC-offset correction circuit comprising:
    an obtaining module configured for obtaining a DC-offset voltage from the output terminal;
    a correction module connected between the output terminal and the feedback input terminal for determining whether the DC-offset voltage is equal to the voltage of the feedback input terminal or not, and comprising:

a first charging switch;

a first inductor connected to the first charging switch in order from the output terminal to the feedback input terminal;

a first charging capacitor connected between ground and the node of the feedback input terminal and the first charging switch; wherein when the voltage of the feedback input terminal is less than the DC-offset voltage, the correction module closes the first charging switch;

when the voltage of the feedback input terminal is equal to the DC-offset voltage, the correction module opens the first charging switch.

2. The DC-offset correction circuit as claimed in claim 1, further comprising a comparison module configured for receiving the DC-offset voltage from the obtaining module, and determining whether the DC-offset voltage is greater than a pre-set threshold voltage, wherein when the DC-offset voltage is greater than the pre-set threshold voltage, the comparison module outputs the DC-offset voltage.

3. The DC-offset correction circuit as claimed in claim 2, wherein the comparison module further comprise a temporary capacitor and a restoring amplifier, when the DC-offset voltage is greater than the pre-set threshold voltage, the temporary capacitor is charged for storing the value of the DC-offset voltage, the restoring amplifier is configured for amplifying the voltage from the temporary capacitor to restore DC-offset voltage.

4. The DC-offset correction circuit as claimed in claim 3, wherein the comparison module further comprise a first positive-edge-triggered flip-flop and a temporary switch, the first positive-edge-triggered flip-flop is connected to a reference voltage equal to the pre-set threshold voltage; the first positive-edge-triggered flip-flop compares the DC-offset voltage with the reference voltage, and make the temporary switch close, when the DC-offset voltage is greater than the reference voltage; the temporary switch is connected between the obtaining module and the node of the temporary capacitor and the restoring amplifier, the temporary capacitor is charged for storing the voltage value of the DC-offset voltage, when the temporary switch closes; the restoring amplifier amplifies the output voltage of the temporary capacitor for restoring the DC-offset voltage.

5. The DC-offset correction circuit as claimed in claim 3, further comprising a resetting module connected to the temporary capacitor and the first charging capacitor, and the resetting module configured for discharging the temporary capacitor and the first charging capacitor completely.

6. The DC-offset correction circuit as claimed in claim 1, further comprising an integrator connected between the comparison module and the feedback input terminal for output an integrated DC-offset voltage to the correction module.

7. The DC-offset correction circuit as claimed in claim 1, wherein the correction module further comprises a charging module and a sub-module, the charging module is configured for increasing the voltage of the feedback input terminal, the sub-module is configured for determining whether the DC-offset voltage is equal to the voltage of the feedback input terminal or not.

8. The DC-offset correction circuit as claimed in claim 1, wherein the charging module further includes a second charging capacitor, a second charging switch, and a second inductor, the second inductor and the second charging switch are connected in order from the output terminal to feedback input terminal; a terminal of the second charging capacitor is electrically connected to the node between the second switch and the second charging switch, the other terminal of the second charging capacitor is connected to ground, the capacitance of the second capacitor is less than that of the first capacitor, the correction module determines the target circuit receives signal or does not, if the target circuit is receiving a signal, the correction module will increase the voltage of the feedback input terminal using the first charging capacitor, otherwise the correction module increase the voltage of the feedback input terminal using the second charging capacitor.

9. The DC-offset correction circuit as claimed in claim 1, wherein the correction module further comprises a switching module electrically connected to the output terminal, the switching module determines whether the target circuit is receiving a signal or not basing on the output voltage of the output terminal.

10. The DC-offset correction circuit as claimed in claim 1, wherein the switching module determines whether the target circuit receives a signal or does not by a received signal strength indicator.

11. The DC-offset correction circuit as claimed in claim 1, the obtaining module includes a first summing amplifier and a second summing amplifier, the first summing amplifier stores a sum of the output voltage of the output terminal and the DC-offset voltage, the second summing amplifier stores the sum of the opposite output voltage of the output terminal and the DC-offset voltage, the obtaining module gets the twice DC-offset voltage by adding the first summing amplifier to the second summing amplifier.

* * * * *